(12) United States Patent
Ohta et al.

(10) Patent No.: US 6,334,618 B1
(45) Date of Patent: Jan. 1, 2002

(54) SEALING DEVICE

(75) Inventors: Takashi Ohta, Ushiku; Hironori Minagawa, Ichikawa, both of (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/274,346

(22) Filed: Mar. 23, 1999

(30) Foreign Application Priority Data

Mar. 23, 1998 (JP) ............................................. 10-094099

(51) Int. Cl.[7] ................................................ F16J 15/32
(52) U.S. Cl. ......................... 277/549; 277/559; 277/569
(58) Field of Search .................................. 277/549, 559, 277/569

(56) References Cited

U.S. PATENT DOCUMENTS 3,633,927 A * 1/1972 Deven ......................... 277/569
3,929,341 A   12/1975 Clark ........................... 277/134
4,822,058 A *  4/1989 Butler et al. ................. 277/569
5,013,052 A *  5/1991 Butler et al. ................. 277/559

FOREIGN PATENT DOCUMENTS

| JP | 60-56618  | 8/1982 |
| JP | 8-159294  | 6/1996 |
| JP | 9-076370  | 3/1997 |

* cited by examiner

*Primary Examiner*—Anthony Knight
*Assistant Examiner*—Enoch E. Peavey
(74) *Attorney, Agent, or Firm*—Jacobson Holman, PLLC

(57) ABSTRACT

On a radially inner surface of a sealing lip of an oil seal, radiation ray is irradiated to induce chemical reaction in the materials of the sealing lip, to form hard helical portions. The hard helical portions act like a helical groove or rib to pump oil back to oil-side to show an excellent sealing property when there is a relative rotational movement between the sealing lip and a shaft to be sealed, as well as even static sealing ability at the time there is no relative rotative movement.

8 Claims, 11 Drawing Sheets

| Irradiation dose(Mrad) | Hardness (JIS A) |
|---|---|
| non-irradiated | 78 |
| 10 | 84 |
| 20 | 85 |
| 50 | 84 |

Fig. 9

Relation between irradiation dose and mechanical properties

|  |  | Irradiation atmosphere | Irradiation dose (Mrad) | Modulus of elasticity at 100% elongation (Mpa) | Strength at break (Mpa) |
|---|---|---|---|---|---|
| Example 1 | Polymer only | $N_2$ | 0 | 1.5 | 1.1 |
|  |  | $N_2$ | 10 | 1.5 | 3.5 |
|  |  | $N_2$ | 20 | 1.5 | 2.8 |
|  |  | $N_2$ | 50 | 1.5 | 2.9 |
| Example 2 | Composition having carbon black | $N_2$ | 0 | 6.5 | 4.2 |
|  |  | $N_2$ | 10 | 6.8 | 11.0 |
|  |  | $N_2$ | 20 | 8.1 | 10.8 |
|  |  | $N_2$ | 50 | 10.5 | 10.3 |

SEALING DEVICE

BACKGROUND OF THE INVENTION

1. Field of the Invention

The present invention relates to industrial sealing parts which are used in those such as car vehicles, electric instruments, machine tools or the like. More particularly, the present invention relates to sealing devices for establishing a seal between relatively movable shaft and housing. More particularly, the present invention relates to sealing devices with a harder portion on an inner surface of a sealing lip, to provide said sealing lip with hydrodynamic pumping effects to pump back oil or fluid to be sealed to the oil or fluid side.

The present invention also relates to a process to make a sealing device having a sealing lip comprising harder helical or circular or screw portions on the inner surface of the sealing lip, the hardened portions are made by irradiation of radiation ray.

2. Description of the Related Art

Conventionally, a sealing device of this type, for example, as is shown in FIG. 10 has been used so far. FIG. 10 is a fragmentary cross-sectional view showing a conventional sealing device which is mounted on a shaft.

As shown in FIG. 10, the sealing device is used to seal a distance or a gap between a housing 500 and a shaft 600, preventing a fluid (oil or the like:) to be sealed from leaking from a fluid (oil or the like) side O to an air-side A.

The sealing device 400 has a rigid (metal) annular casing 401 with a sealing member such as a sealing lip (402, 405) which is formed on the rigid annular casing 401 in one body. A radially inwardly tip portion of an inner periphery of the sealing lip is urged toward the shaft 600 to make the tip portion slidably and sealingly engage with the shaft 600, by a garter spring 403 in a spring holder 404 (as shown in FIG. 10).

A secondary sealing lip (dust sealing lip) 405 in FIG. 10 is additionally formed in the air-side A of the sealing device for preventing contaminants from entering into the oil-side O from the air-side A.

In such a conventional sealing device 400, in order to secure more effective sealing properties, the main sealing lip 402 has an important element, such as a helical pumping rib 406 (as shown in FIG. 11 and 12) on the inner surface of the sealing lip. FIG. 11 is a fragmentary cross-sectional view showing a conventional sealing device, and FIG. 12 is a cross-sectional view taken along the line Y–Y'. As shown in FIG. 11, on the inner surface of the main sealing lip 402 a plurarity of helical pumping ribs 406 are formed. By providing these helical pumping ribs, pumping functions to pump back fluid or oil to be sealed to the oil-side O is effectively secured.

Conventional sealing device mentioned above has following shortages.

1. In order to provide such helical pumping ribs on the inner surface of the sealing lip, sealing devices are transfer or injection molded in a mold having helical pumping ribs thereof. To provide helical pumping ribs in the mold, however, causes shortages such as an increase of a burden in designing or processing, to cause increase in cost.

2. On the other hand, in the case that these convexo-concave portions 406 of helical pumping ribs are provided on the inner surface of the sealing lip, the convex portions tend to be exposed to a severe friction with the shaft 600 compared with portions other than the convex portions of the inner surface of the sealing lip, causing severe abrasion especially at the convex portions to bring the initial configuration (shape) of the helical ribs into other configuration (shape) with proceeding of abrasion. These phenomena cause unstable sealing properties of conventional sealing devices in long use.

To cope with these problems mentioned above, it is necessary for us, by estimating the change of the configuration (shape) of the helical ribs with proceeding of the abrasion at the portion of the ribs, to design the shape of the helical ribs precisely, so that the sealing devices have stable sealing properties even in the long use. It is, however, very difficult to estimate accurate abrasion mode, as well as to design the shape of the ribs based on the estimated abrasion mode in long use.

Another type of conventional sealing device is shown in FIG. 13. As is shown in FIG. 13, another type of conventional sealing device 700 is designed to seal a distance or a gap between an annular housing 900 and a shaft 800, preventing a fluid (oil or the like) to be sealed from leaking from a fluid (oil or the like) side O to an air-side A.

The conventional sealing device 700 has a rigid (metal) annular casing 701 with a rubber sealing member 702 in one body, and with a resin sealing member 703 which is placed between and held by the annular rigid casing 701 and the rubber sealing member 702.

The rubber sealing member 702 comprises a radially outer peripheral sealing portion 702b which firmly contacts with the hausing to seal a fluid, a sealing lip 702a which slides on and seals the shaft 800, and a radially extending portion 702c which connects to the radially outer peripheral sealing portion 702b, in one body.

The resin sealing member 703 backs up a base portion 702d of the sealing lip 702a of the rubber sealing member 702 to prevent the base portion 702d from over deformation caused by pressure from the oil-side O, and also slides on and seals the shaft 800.

Accordingly, the resin sealing member 703 is preferably made of a resin material having certain degree of bending resistance (or flexibility) in order to secure the shape thereof and the engagement with the shaft 800. Examples of such resin materials having specific flexibility (which means not so rigid), are fluoro polymers such as PTFE (Polytetrafluoroethylene) or the like.

Moreover, differing from the sealing lip or the like made of rubber which has sufficient elasticity, the resin sealing member 703 can not give a strong tension to all over the sealing periphery of the surface of the shaft. Oil leakage tends to occur due to the lack of tension in resin sealing member. In order to prevent oil leakage, grooves 704 having a pumping property are usually formed on the sealingly engaging surface of the resin sealing member 703.

The groove 704 has a structure to give the resin sealing member 703 a pumping function to pump oil back to oil-side O at the time there is relative rotational movement between the sealing device 700 and the shaft 800.

When the sealing device 700 is used in such a place where the shaft 800 is only driven in one rotational direction (not in reverse rotational direction) relative to the sealing device, the grooves 704 are preferably formed in a screw type manner, thereby providing the sealing device 700 with one way pumping effect. On the other hand, when the shaft 800 is driven in both normal and reverse rotational directions, a plurality of grooves 704 are preferably formed in a concentric circular manner, thereby exerting moderate pumping effect on the sealing device even in both normal and reverse rotations of the shaft 800. The distance or the gap between the shaft 800 and the hausing 900 is effectively sealed by the sealing device mentioned above.

As is shown in FIG. 14A and 14B (Japanese Patent Tokosho 60-56618), the resin sealing member 703 has been prepared to form the helical groove by using thread cutting means, on a surface 707 of an end portion of a resin tubular body 705, which has a predetermined inner and outer diameter made of resin material such as PTFE (Polytetrafluoroethylene or the like); and then cutting off the end portion by a cutting means 706 from the resin tubular body 705 to make a washer-like plain sealing member 703 with helical groove (as shown in FIG. 14A). Helical groove can be made by press forming processes as well as cutting processes.

A pressing tool 800J, which has an approximately same outer diameter as that of the shaft 800 to be sealed, is inserted, by using a press machine or the like, into an inner hollow bore of the thus obtained washer-like plain sealing member 703, thereby bending a lip portion thereof at a predetermined angle and forming a sealing lip portion 703a which is designed to slide on and seal the shaft 800 (as shown in FIG. 14B).

These conventional sealing members 703 have deficiencies as described below. There are some inefficiencies in the conventional manufacturing process such as groove forming process on the resin tubular body, cutting off process of the end portion, bending process to form sealing lip or the like.

Moreover, washer-like sealing members having large inner bore have a shortcoming in process because the productivity of the conventional sealing members 703 decreases with increasing in wall thickness of the resin tubular body 705, and the material cost also becomes large with increasing in wall thickness.

Further more, resin materials such as PTFE or the like have an extremely low in elastic elongation limit compared with elastomers usually having high elasticity, so the resin sealing member without bending process mentioned above, are prone to be inadvertently distorted or in some cases broken.

SUMMARY OF THE INVENTION

It is therefore an object of the present invention is to provide a sealing device having an excellent anti-abrasion property.

Another object of the invention is to provide a sealing device having an excellent sealing property in long use.

A still another object of the present invention is to provide a process of making a sealing device having an excellent anti-abrasion property.

A further object of the invention is to provide a process of making a sealing device having an excellent anti-abrasion property at low cost.

These objects of the present invention are achieved by a sealing device, comprising; a rigid annular casing provided with an elastic rubber like sealing lip disposed in an axial direction of the sealing device, and said sealing lip having a frustoconical air-side surface and having a frustoconical oil-side surface; and a harder helical portion disposed on said frustoconical air-side surface, the hardness of said harder helical portion being harder than the hardness of said sealing lip. The harder helical portion on the inner surface of the frustoconical air-side surface is formed by hardness variation making means which forms the harder portion on the surface of elastic rubber or rubber like materials.

Another objects of the present invention are achieved by providing a process for making a sealing device, comprising the steps of; preparing a foreproduct of said sealing device having a rigid annular casing, a molded elastomeric member bonded to said casing and a sealing lip defined by a frustoconical air-side surface and a frustoconical oil-side surface; radiating radiation ray on said frustoconical surface to form said harder helical portion.

The harder helical portion or harder portion can be obtained by inducing chemical reaction in rubber compositions. Chemical reactions can be induced by irradiation of radiation ray. The thus obtained harder portions have a pumping function to pump back oil or fluid to be sealed to oil or fluid side to give sealing devices excellent sealing properties. Said radiation ray is preferably an electron beam.

Another object of the present invention can be achieved by providing an additional sealing member comprising thermoplastic elastomer placed between a main rubber sealing lip and a rigid annular casing, said additional sealing member having a harder portion on its sealing surface. By providing such a harder portion by chemical process, a sealing device having high productivity and low cost as well as an excellent sealing property, can be obtained.

Further objects of the present invention can be achieved by providing a process for making a sealing device having the additional sealing member, comprising the steps of; preparing a sheet or a washer-like annular member made of a composition comprising thermoplastic elastomer;

radiating radiation ray on a predetermined surface of said sheet or washer-like annular member; and molding said sealing device by placing, in a mold, a rigid annular casing, said radiated washer-like annular member and a rubber composition so as to set said annular member being placed between and held by said rigid annular casing and said rubber composition, said radiated washer-like annular member being bent in an axial direction thereof so as to make said radiated portion of said annular member slide on and seal the surface of said shaft.

The harder portion can be obtained by inducing chemical reaction in thermoplastic elastomer compositions. Chemical reactions can be induced by irradiation of radiation ray. The thus obtained harder portion has a pumping function to pump back oil or fluid to be sealed to oil or fluid side to give sealing devices excellent sealing properties.

Thermoplastic elastomer is used as a material of the additional sealing member in the sealing device. On the specific area of the surface of the additional sealing member, radiation ray is irradiated to change the properties of the surface of the sealing member.

The properties of the specific area of the surface of the sealing member, that is, the crosslinking condition or elasticity of the specific area, can be varied selectively and arbitrarily so that, by using these method, the changes in flexibility of the sealing lip portion can be carried out somewhat arbitrarily, or fluid or oil retention can also be achieved by forming minute convexo-concave configuration in the sealing region which contacts with the shaft to be sealed, or seal or drain of oil can also be achieved by designing the shape and configuration of the specific area.

There is also no need to use conventional mechanical machining process to obtain these properties in the sealing member, and there is no need to take such an additional process as bending the washer-like sealing member by inserting a pressing tool having the same diameter as that of the shaft, because of the thermoplastic elastomers having elasticity itself to bend easily with no damage thereof. Thereby the productivity can be greatly improved.

These features mentioned above derive from a cross-linking structure, and the degree of cross-linking can be adjusted by choosing both irradiation dose and irradiation energy of radiation ray.

Furthermore, the specific area of the sealing surface of the sealing member is preferably irradiated by radiation ray. When stress is applied to the sealing member, convexo-concave configuration is formed on the irradiated sealing surface of the sealing lip.

Sealing member is a washer-like annular member, which is preferably made of thermoplastic elastomer composition, and the inner diameter of the sealing member is bent in the axial direction thereof at the time the sealing device is mounted on the shaft, and the radially inner peripheral surface of the sealing member is used as a sealing which slide on and seal the shaft. Said radiation ray is preferably an electromagnetic wave. Said thermoplastic elastomer can preferably be selected from the group of fluorothermoplastic-based elastomers.

As for a process for manufacturing the sealing device, washer-like sealing member is preferably made of a composition comprising thermoplastic elastomer, and radiation ray is radiated on a specific region thereof to cause physical and chemical changes in the elastomer.

BRIEF DESCRIPTION OF THE DRAWINGS

FIG. 9 is a chart table showing changes of mechanical properties in thermoplastic elastomer and a composition comprising thermoplastic elastomer after irradiation by radiation ray of the present invention;

DESCRIPTION OF THE PREFERRED EMBODIMENT

Referring to Figures, preferred embodiments of the present invention will be explained precisely. Dimension, conformation, configuration, materials, size or the like mentioned below, except specific notification, do not have an effect to limit the scope of the present invention.

First Embodiment

Figure 1:
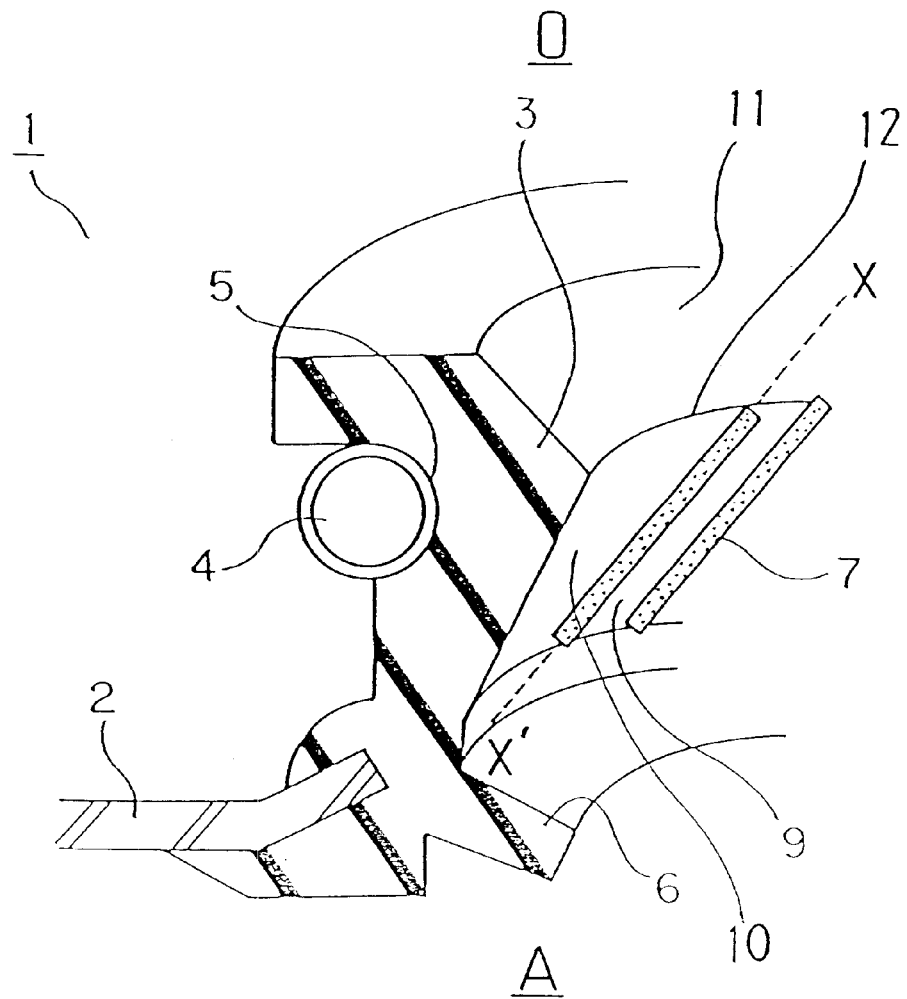
FIG. 1 is a fragmentary cross-sectional view showing the sealing device according to the present invention.
Figure 2:
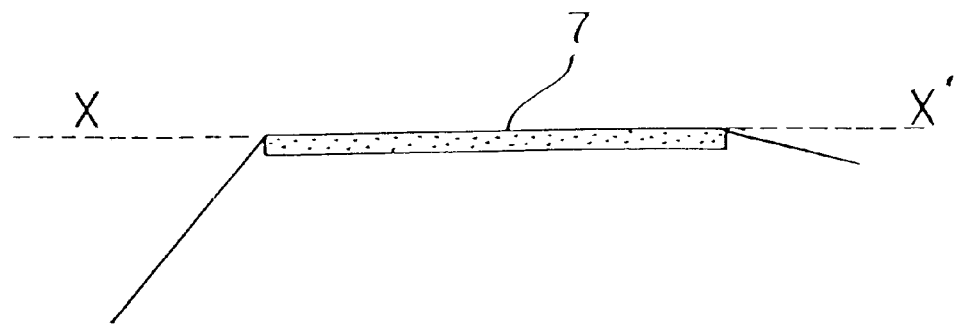
FIG. 2 is a cross-sectional view taken along the line X–X' of FIG. 1.

One of the sealing devices of the present invention is shown in FIGS. 1 to 3 and FIG. 4 (Chart Table). FIG. 1 is a fragmentary cross-sectional view showing the sealing device 1 of the present invention and FIG. 2 is a cross-sectional view taken along the line X–X' of FIG. 1.

Figure 10:
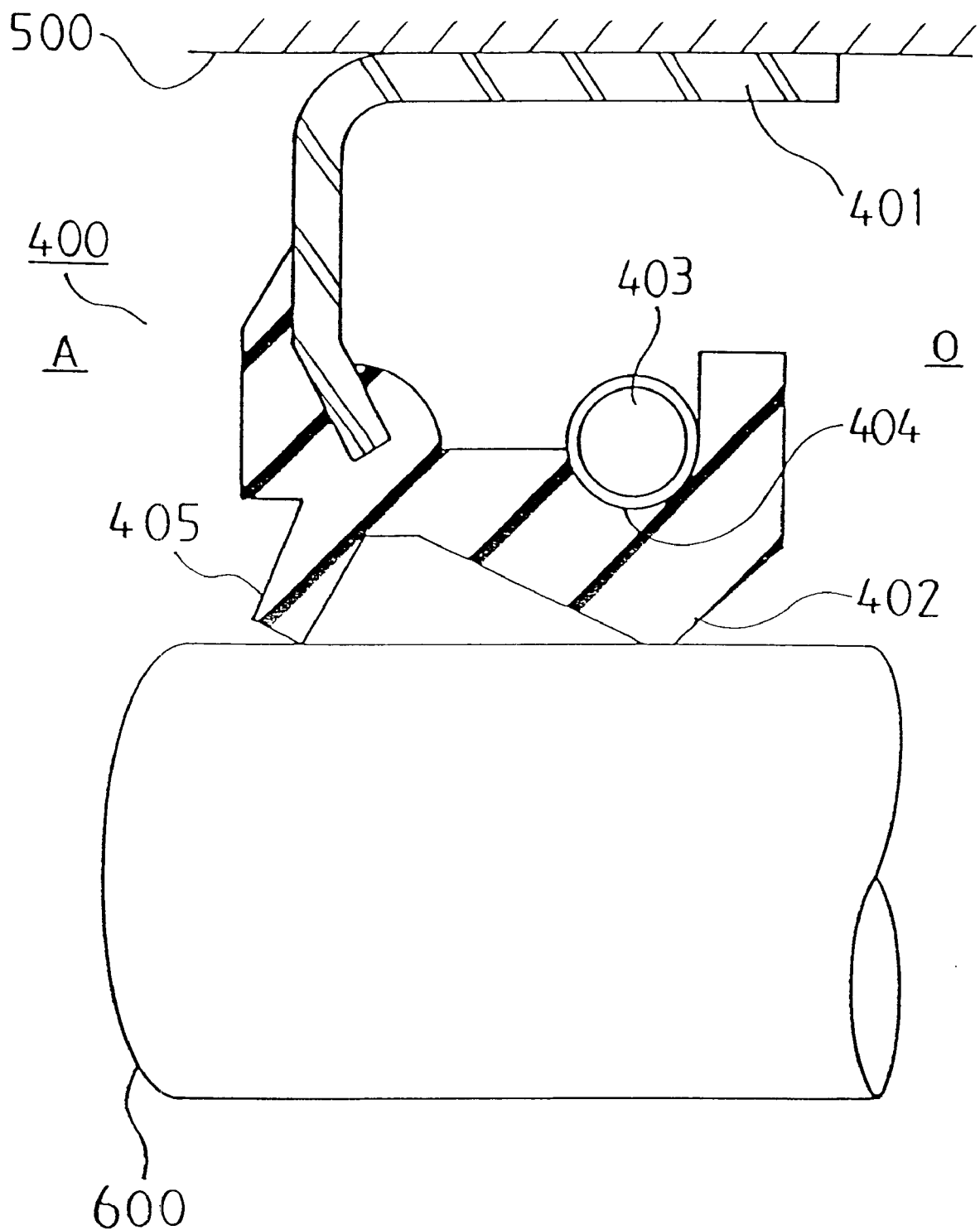
FIG. 10 is a fragmentary cross-sectional view showing a conventional sealing device which is mounted on a shaft.

Referring to FIG. 1, the sealing device 1 comprises a rigid annular casing (a part of which is shown as numerical reference 2) made, for example, by stamping of a sheet metal blank, and an annular sealing lip 3. Similar to the conventional design as shown in FIG. 10, the rigid annular casing 2 has a tubular mounting portion (not shown) and a bonding flange 2. The annular sealing lip 3 is bonded to the bonding flange 2, and engages with a shaft (not shown) to slide and seal. The sealing device 1 also comprises a conventional dust lip 6 which prevents contaminants from entering into oil-side O from air-side A. In regard to terminology of "oil-side" O and "air-side" A, the "oil-side" O is a nearer side to where oil or fluid to be sealed is placed, and the "air-side" A is a nearer side to an opposite direction of the "oil-side" O. The frustoconical surface 11 facing to the oil-side O will be referred to as the "oil-side" surface and the opposite surface 10 facing to the air-side A will be referred to as the "air-side" surface. The annular sealing lip 3 is, for example, defined by a pair of frustoconical surfaces 10 and 11 meeting with each other to form a sharp sealing edge 12. A conventional garter spring 4 is mounted within a spring groove 5 formed on the outer periphery of the annular sealing lip 3, and urges the main annular sealing lip 3 toward the shaft (not shown).

The sealing lip 3 is made of rubber composition comprising rubber such as, for example, acrylic rubber (acrylic ester-based polymers), fluoro rubber (vinylidene fluoride-based, tetrafluoroethylene-propylene-based, tetrafluoroethylene-perfluoroalkylvinylether-based polymers), NBR (acrylonitrile-butadiene-based rubbers, hydrogenated acrylonitrile-butadiene-based rubbers ), EPDM (ethylene-propylene-based rubbers), natural rubber or isoprene rubber or the like. Conventional fillers and additives can also be added in these rubbers. These rubbers or rubber compositions have a tendency to be cross-linked when radiation ray is radiated thereon. Radiation ray includes, in the present invention, all electromagnetic waves and corpuscular beams such as electromagnetic waves or electron beams. Electron beam is preferably used in the present invention. Radiation energy and radiation dose is also chosen so as to induce cross-linking in these rubbers, so as not to induce decomposition in these rubbers.

The frustoconical air-side surface 10 is irradiated by radiation ray having a predetermined energy and time, to form a harder helical portion 7 on the surface 10 as shown in FIG. 1. Before irradiation, a mask which has a plurality of helical slits is preferably placed on the frustoconical air-side surface 10 and then radiation ray is irradiated over the mask at a predetermined radiation energy. and at a predetermined exposure dose. In regard to terminology of "helical", "helical" means a shape of the harder portion which has various elongated shapes such as string like, linear, rectangular, triangular, trapezoid, circular, screw or the like.

The number and the shape of harder helical portions, or its allocation on the surface 10, can be selected freely. The angle of the intersection between the long direction of the helical portion 7 and the edge line 12 is also selected freely.

The surface of the portions 7 in the frustoconical air-side surface 10, and a portion a little bit under the frustoconical air-side surface 7, become harder in hardness in the shape of helical as is shown in FIGS. 1 and 2.

Figures 3, 4:
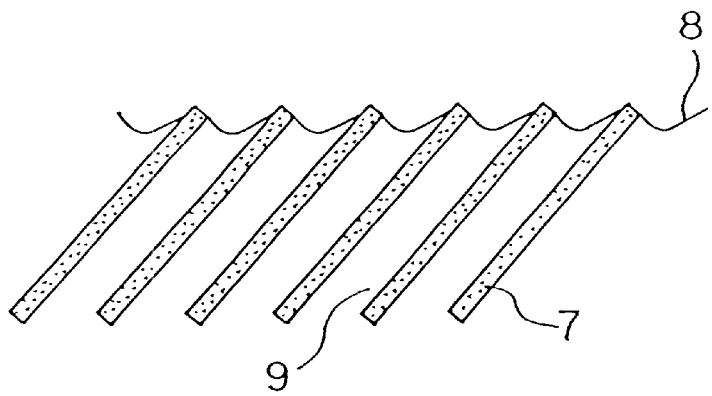
FIG. 3 is a schematic view showing a part of an inner surface of the sealing lip which is in a state of using, of the present invention.
FIG. 4 is a chart table showing changes in hardness of the rubber like materials which is used in the sealing device of the present invention.
Figure 11:
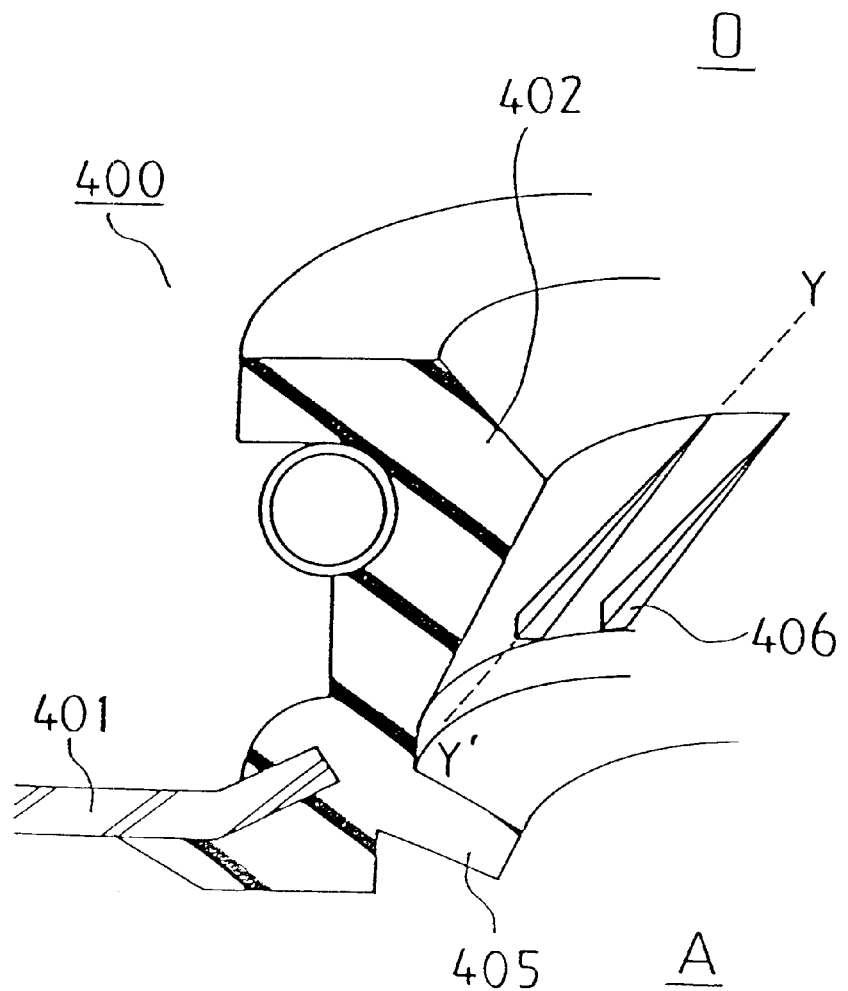
FIG. 11 is a fragmentary cross-sectional perspective view showing a conventional sealing device having helical ribs on a frustoconical air-side surface.
Figure 12:
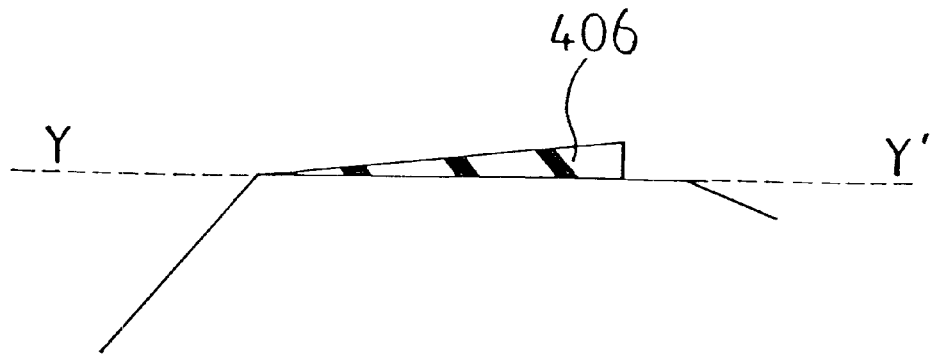
FIG. 12 is a cross-sectional view taken along Y–Y' line of FIG. 11

FIG. 3 is a schematic view showing a part of a radially inner surface of the sealing lip 3, which is in a state of using namely there is a relative movement between the sealing lip 3 and the shaft (not shown). The softer portion 9 which is non-irradiated is tend to be elongated compared with the harder portion 7, which is irradiated and having a tendency not to be elongated, by the friction, in the circumference direction, between the inner tip 12 of the sealing lip 3 and the shaft (not shown). Thereby the elongated softer portions 9 become concave shape grooves 8, and the non-elongated harder portions 7 become convex shape ribs. These convex shape ribs 7 work like a conventional ribs 406 of FIG. 11, to give the sealing device a pumping effect, to pump oil or fluid back to oil or fluid side O to effectively seal oil or fluid.

When there is no relative movement between the sealing device and the shaft, the sealing lip having harder portions is snugly fitted with all around the outer periphery of the shaft to prevent oil from leaking through an interface between the sealing lip and the shaft, because no- or a little deformation or no grooves are there in the surface of the sealing lip, resulting in no oil leak from oil-side to airside even at the time of no relative movement between the sealing lip and the shaft.

Hardness of the harder helical portion can be regulated freely by selecting exposure dose, kinds of radiation rays and rubber composition of the sealing lip.

The irradiated rubber portions have higher in hardness and, thereby, are less susceptible to be abraded when compared to the conventional sealing lip having a convex ribs which have lower in hardness when compared with the irradated rubber portion, and protruding from the surface of the frustoconical air-side surface; giving sealing devices an excellent sealing property in long use. There is also no need to make ribs on molds for molding sealing devices, so manufacturing, designing and processing cost can also be cut substantially.

In this embodiment, two kinds of portions—harder and softer portions—are provided, but some portions respectively having various degree of hardness can also be provided in accordance with various purposes and usages.

FIG. 4 (Chart Table) shows test results. Vinylidene fluoride-hexafluoropropylene rubber containing conventional MT carbon black and curatives was used as the rubber of sealing lip. The hardness of the rubber was measured using JIS A hardness meter at 25° C. Electron beam having 250 keV was used. As is shown in Chart Table 4, the hardness of the rubber irradiated were higher than that of non-irradiated portion by 6 to 7 points.

Second Embodiment

Figure 5:
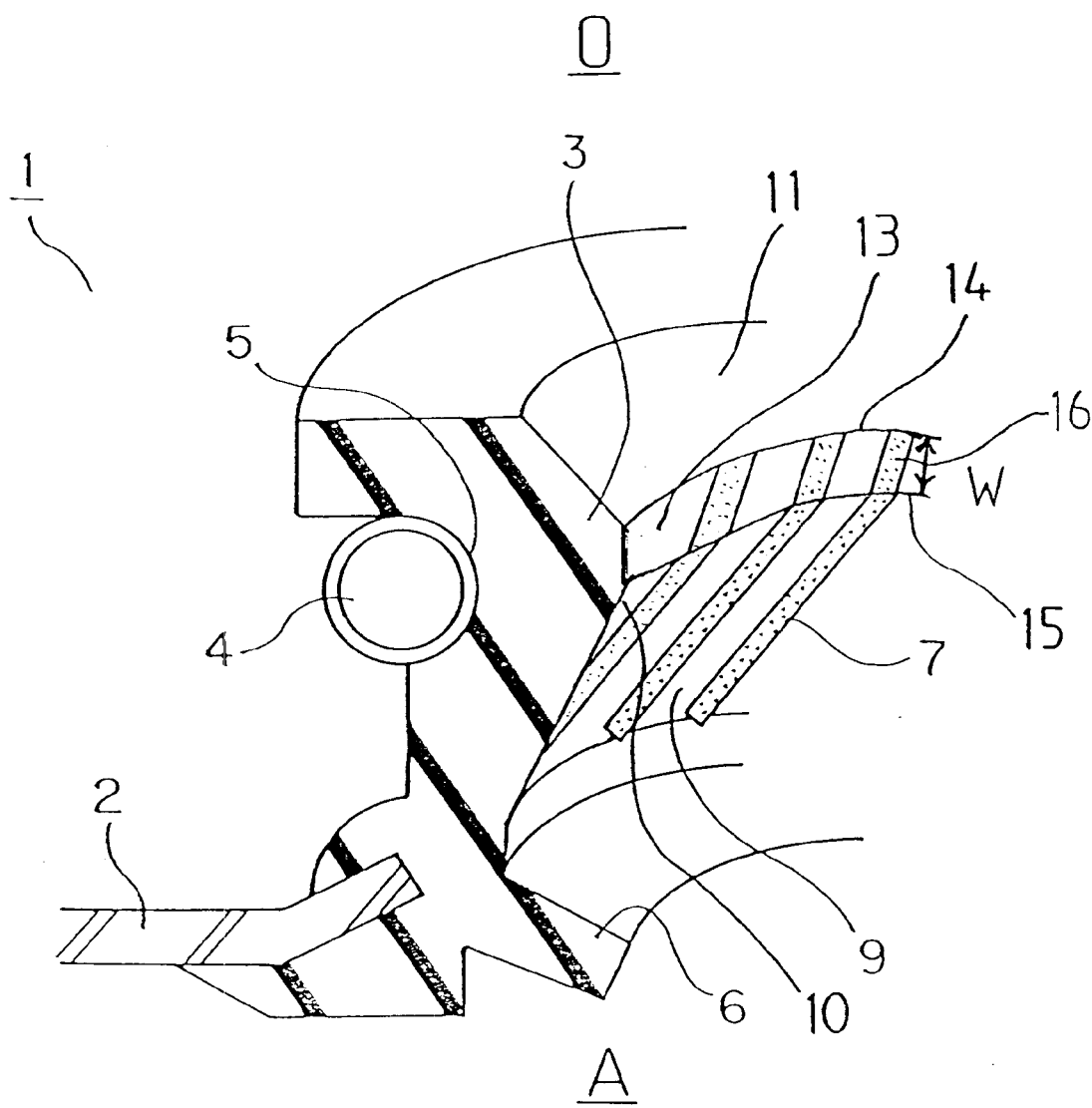
FIG. 5 is a fragmentary cross-sectional view showing the sealing device of another embodiment according to the present invention.

The configuration of the sealing device of Second Embodiment is similar to the First Embodiment except an additional so-called flat surface in the sealing lip (as shown in FIG. 5). Some reference numerals used in FIG. 5 are same in FIG. 1. The sealing lip is made of the same kind of rubber composition mentioned in First Embodiment. This type of sealing device 1 has a frustoconical air-side surface 10 and a frustoconical oil-side surface 11, and a third annular substantially frustoconical (or flat) surface 13 placed between the frustoconical air-side surface 10 and the frustoconical oil-side surface 11. There are annular edge lines 14 and 15, which are defined by the frustoconical oil-side surface 11 and the third flat surface 13, and the frustoconical air-side surface 10, respectively as is shown in FIG. 5. The third annular flat surface 13 has a predetermined width W and slidably and sealingly engages with a shaft (not shown) to be sealed. In FIG. 5, the flat surface 13 is shown like a frustoconical surface having a diameter thereof gradually increasing from the oil-side O to the air-side A.

When the sealing device is mounted on the shaft to be sealed, all flat surface 13 snugly contacts with the surface of the shaft (not shown), because of the sealing lip 3 being designed to fit snugly with the shaft (not shown). On the frustoconical air-side surface 10, there are a plurality of harder helical portions. On the third flat surface 13, a plurality of harder helical portions 16 are further formed in this embodiment. The harder helical portions work like helical convex ribs when there is a relative rotational movement between the flat surface 13 and the shaft (not shown), to pump oil back to oil-side O. The third frustoconical surface 13 has an excellent resistance to abrasion against the shaft because of the surface 13 having, in the surface thereof, higher hardness portions which is harder in abrasion, achieving an excellent sealing properties in its long use. When there is no relative movement between the flat surface 13 and the shaft, all the flat surface 13 is snugly fitted with the surface of the shaft because there is no protruded ribs in the surface 13.

Third to Fifth Embodiment

Another type of sealing devices will now be explained. Third to Fifth Embodiment relate to another type of sealing device, which comprises;

a rigid annular casing provided with a molded rubber like sealing lip disposed in an axial direction thereof, said sealing lip having radially inner portion slidably and sealingly engaging with a shaft;

a thermoplastic elastomer sealing member disposed between said rigid annular casing and said sealing lip, said thermoplastic sealing member having a sealing portion slidably and sealingly engaging with said shaft to be sealed; and a harder portion disposed on said sealing portion of said thermoplastic elastomer sealing member.

Said harder portion being harder than the hardness of said thermoplastic elastomer sealing member, and said harder portion acts like a conventional pumping rib when there is a relative movement between said sealing portion and said shaft.

Third to Fifth Embodiment also relate to the process of the above sealing devices.

Third Embodiment

Figure 6A:
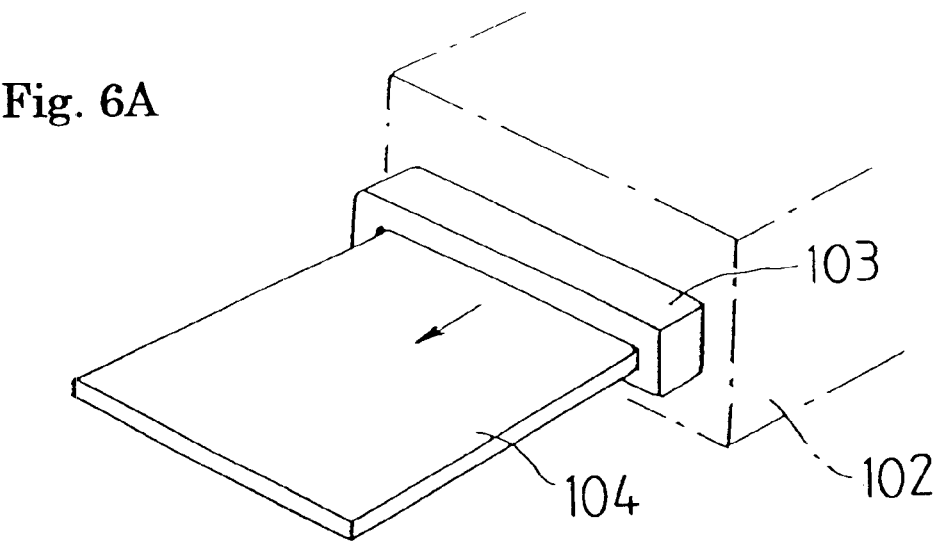
FIGS. 6A, 6B and 6C are schematic views showing a process of manufacturing a washer-like sealing member made of a composition comprising thermoplastic elastomer of the present invention.
Figure 6B:
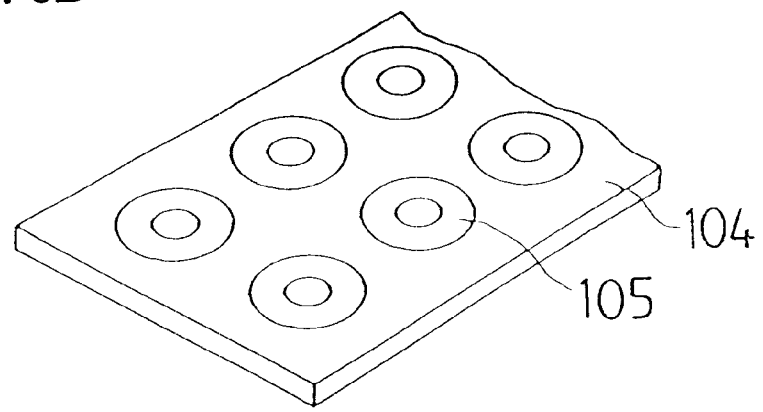
Figure 6C:
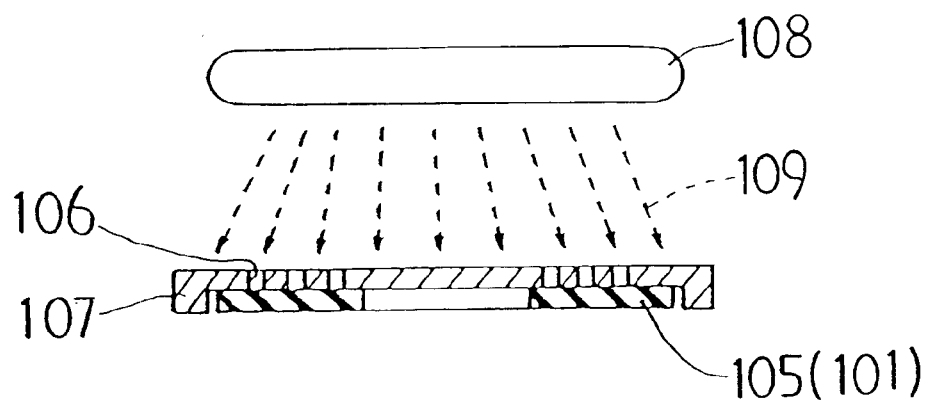

Referring to FIG. 6A, 6B and 6C, Third Embodiment, a process of manufacturing a sealing member 101 (in FIG.

Figure 13:
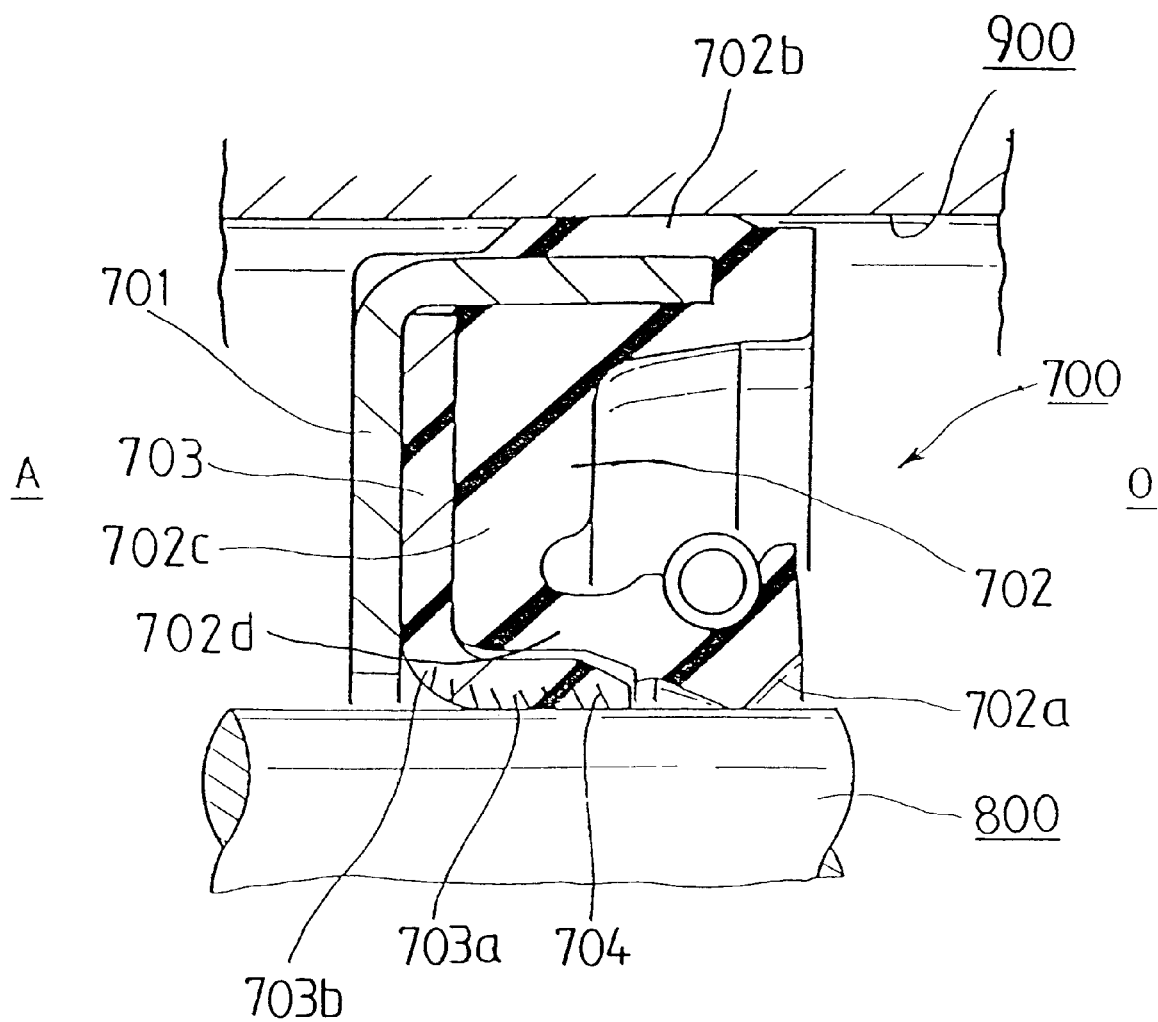
FIG. 13 is a fragmentary cross-sectional view showing another conventional sealing device having an additional sealing member.

7A), will be explained. The sealing member 101 of Third Embodiment can be used in place of the sealing member 703 of the conventional sealing device 700 in FIG. 13. Accordingly, configuration and processing of the sealing device of the present invention is similar to the conventional sealing device as shown in FIG. 13, except the sealing member 703 in FIG. 13.

The sealing member 101 of the present invention is made of thermoplastic elastomer composition. Thermoplastic elastomer composition can be extruded from a sheet die. A sheet 104, from which the sealing member is made, can be continuously manufactured by using both an extruder 102 and a sheet die 103 combined (as shown in FIG. 6A).

Radiation ray is used as the hardness variation making means. The radiation ray having an energy of from about 150 eV to about 10 MeV can be preferably used. When radiation ray irradiates the surface of thermoplastic elastomer composition, radiation effects (cross-linking or the like) are induced in thermoplastic elastomer composition, and hardness of thermoplastic elastomer composition irradiated becomes higher than that of non-irradiated portions, due to the cross-linking reaction or the like at the portion the beam is radiated in the shape of helical. circular or the like. Exposure dose of radiation ray on the composition is usually in the range of about 5 Mrad to about 100 Mrad, preferably, about 5 Mrad to about 70 Mrad.

The sheet 104 extruded from the sheet die 103 is cut in a shape of a doughnut (105) by, for example, press cutting process, to make a washer-like annular member 105 (FIG. 6).

Then the thus obtained annular member 105 is covered with a mask 107 having a plurality of apertures 106 having predetermined pattern, and then radiation ray 109 is irradiated onto the surface of the annular member 105 using radiation irradiator 108, thereby mechanical properties of the irradiated regions of the annular member become to be a different from that of a region non-irradiated (as shown in FIG. 6C).

Shape of the apertures can take various patterns such as helical, spiral or vortical, a plurality of concentric circles, or a screw.

The term "change of mechanical properties" in the Third Embodiment means a change of properties caused by cross-linking of thermoplastic elastomer composition by irradiation of radiation ray 109. Irradiation of radiation ray enables thermoplastic elastomer composition to have higher degree of crosslinking portion (or cross-linking structures) than other portion non-irradiated. With changing these cross-linking structures, hardness and modulus of elasticity of the thermoplastic elastomer composition, which is irradiated by radiation ray 109, is also at the same time led to high.

Thermoplastic elastomer such as block type fluorothermoplastic elastomer or the like is preferably used as one of a composition for sealing member 101. Thermoplastic elasomer has both a soft segment and hard segment in its composition. Examples of the soft segment (fluoro rubber) in the block type fluoro thermoplastic elastomer are vinylidenefluoride-hexafluoropropylene-tetrafluoroethylene terpolymer or the like can be used, and examples of the hard segment (fluoro plastic) are polyvinylidene fluoride, tetrafluoroethylene-ethylene copolymer or the like.

Polymer composition comprising conventional carbon black and/or other additives can be used as a material for the sealing member 101.

Ionizing radiation having specific frequency band which effectively can cause changes in polymer properties is preferably used in the present invention. Electron ray having energy of about 150 eV to about 10 MeV is also preferably used. To let electron ray enter (penetrate) deeply into the polymer, electron ray having high energy is necessary to be used. On the other hand, when sealing member having thin in thickness is used, electron ray having energy not more than about 300 keV can be used.

Figure 14A:
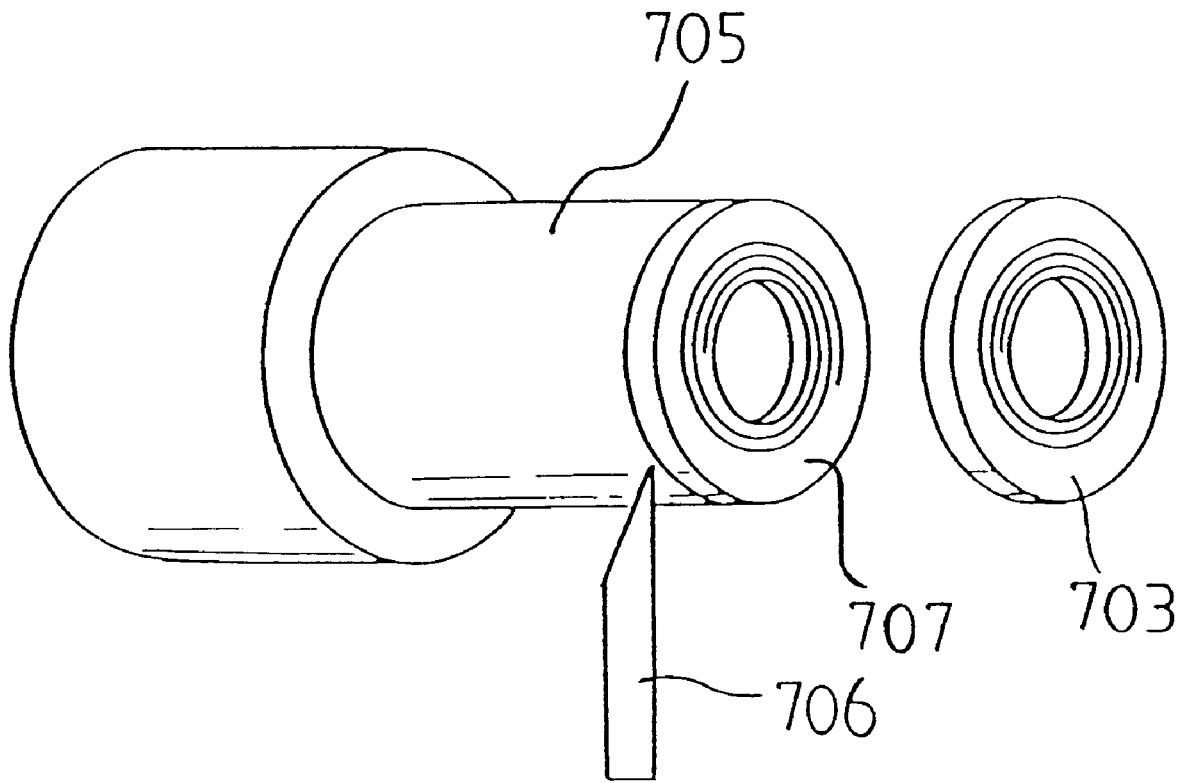
FIGS. 14A and 14B are schematic views showing a process of manufacturing a conventional washer-like sealing member.
Figure 14B:
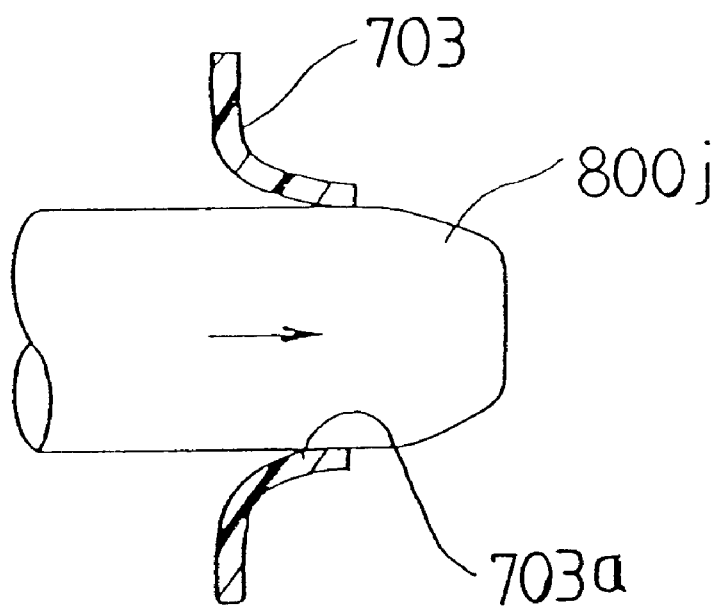

As for irradiation time, cross-linking reaction can be completed in less than about one (1) second in the case electron ray is used. Preferably, irradiation is carried out in an atmosphere of vacuum or inactive gas such as nitrogen ($N_2$) or the like. Irradiation process can be carried out in a continuous process line, so productivity of the sealing member of the present invention can be extremely improved when compared with such a conventional cutting process as shown in FIG. 14A and 14B.

Forth Embodiment

In the Forth Embodiment, application of the sealing member 101 having a specific harder portion to a sealing device will be explained.

Figure 7A:
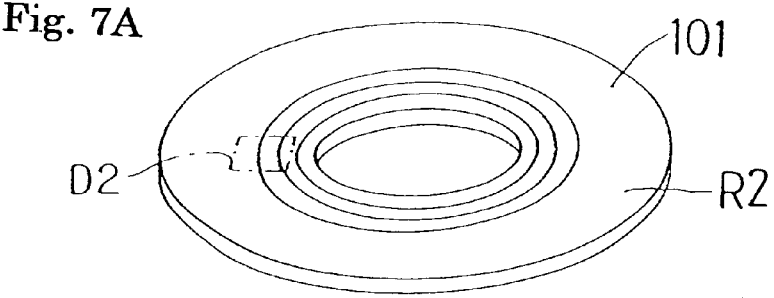
FIG. 7A is a schematic view of a washer-like sealing member irradiated by irradiation ray of the present.
Figure 7B:
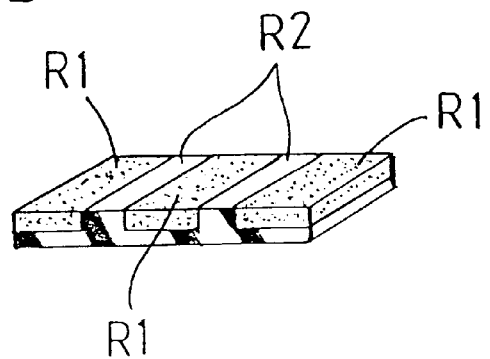
FIG. 7B is a schematic enlarged view of a portion of D2 in FIG. 7A.
Figure 7C:
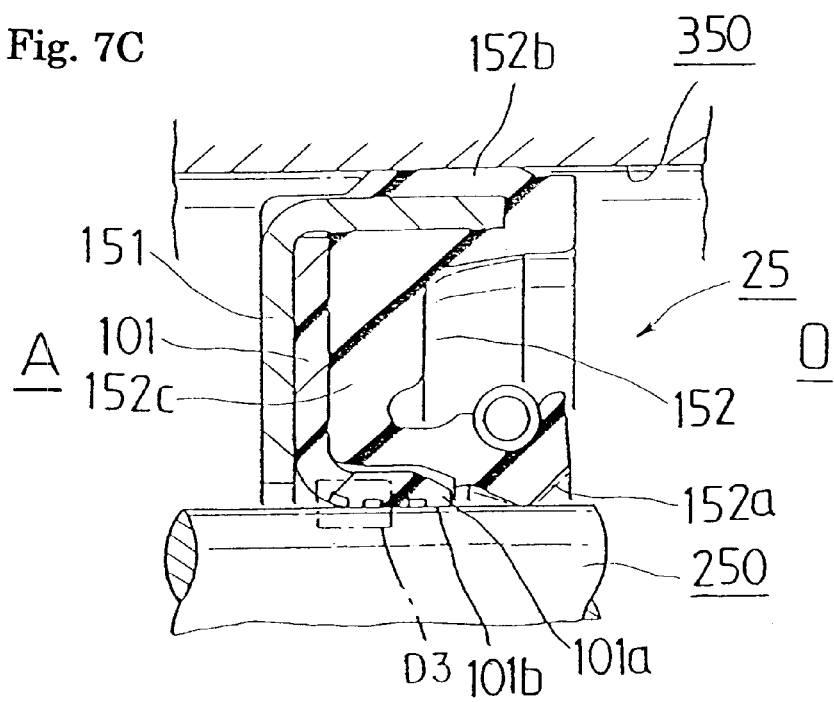
FIG. 7C is a fragmentary cross-sectional view showing another sealing device having bended washer-like sealing member made of a composition comprising thermoplastic elastomer of the present invention.
Figure 7D:
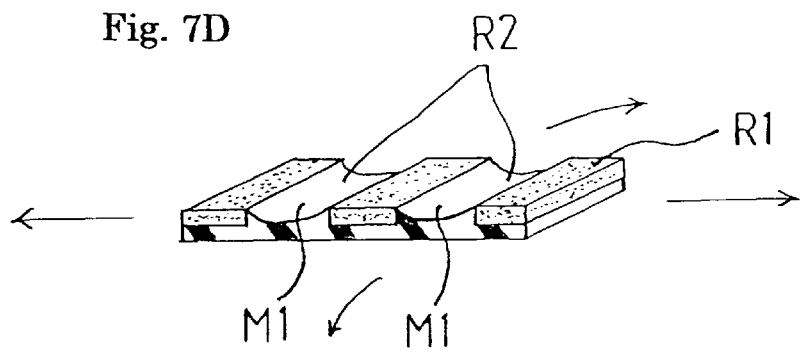
FIG. 7D is a schematic enlarged view showing a portion of D3 in FIG. 7C.

FIGS. 7A, 7B, 7C and 7D show a sealing member 101 of the present invention and a sealing device 25. FIG. 7A is a perspective view showing the sealing member 101 which is irradiated by radiation ray, and FIG. 7B is an enlarged perspective view of the portion of D1 in FIG. 7A. FIG. 7C is a fragmentary cross sectional view showing a sealing device 25 having the sealing member 101 in place of a conventional sealing member 703 in FIG. 13. FIG. 7D is an enlarged perspective view of the portion of D3 in FIG. 7C.

As shown in FIG. 7A and 7B, the sealing member 101 has two portions of irradiated portion R1 and non-irradiated portion R2 respectively by irradiation of radiation ray, thereby patterned distribution of a degree of cross-linking, namely, patterned distribution of the elasticity are there on the surface of the sealing member 101. In Forth Embodiment, each non-irradiated portion R2 is disposed in a shape of a plurality of concentric circles as is shown in FIG. 7A and 7B.

As is shown in FIG. 7C, after accommodating the sealing member 101 into the sealing device 25, the sealing device 25 is mounted at an annular gap between the housing 350 and the shaft 250. When the sealing device 25 is mounted on the shaft 250, radially inner portion 101a of the sealing member 101 bends toward the axial direction with enlarging its radially inner portion, then the portion facing to the shaft 250 becomes a sealing portion 101b (in FIG. 7C).

The sealing member has no need to use conventional pressing prodedure as shown in FIG. 14B, because thermoplastic elastomer composition is easily elongated than the conventional sealing member made of resin such as PTFE.

As is shown in FIG. 7D, stress (tension in the axially and radially direction) in the direction of arrow in FIG. 7D is applied in the sealing portion 101b. Deformation of the non-irradiated portion R2, which has less elasticity, is larger than that of irradiated portion R1, which has more elasticity, to form a small concave-like groove M1.

The grooves M1 and M1 show pumping function to pump oil back from air-side A to oil-side O, and also have a function to retain oil in the grooves. These functions improve sealing ability of the sealing device 25.

It is also possible to prevent rupture in sealing portion 101 because there is no conventional sharp cut portion (704 in FIG. 13) which causes a trouble such as a growing of a rupture at the cut portion, thereby it is possible to secure long life of the sealing device in use.

Fifth Embodiment

Fifth Embodiment will also be explained about the manufacturing process of sealing devices of the present invention.

Figure 8A:
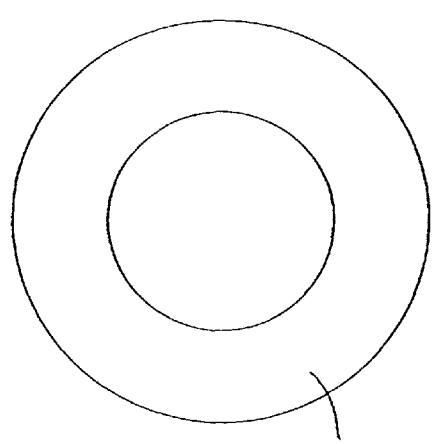
FIG. 8A is a plain view showing a washer-like thermoplastic elastomer member which is not irradiated by radiation ray of the present invention.
Figure 8B:
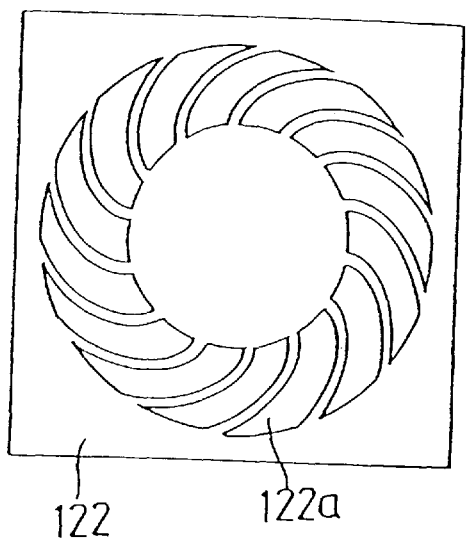
FIG. 8B is a plain view showing a metal cover having specific slits of the present invention.

Sealing members of Fifth Embodiment were made of fluoro thermoplastic elastomer- based composition. Diel Thermoplastic T630 (manufactured by DAIKIN Co.) was used as a composition comprising fluoro thermoplastic elastomer. The Diel Thermoplastic flows at under high temperature, but shows rubber like elasticity at under its crystallization temperature. Sheets can be continuously obtained using a conventional extruder and sheet (T) die. Washer-like thermoplastic sealing member can be easily manufactured by die cutting or the like from the sheets. To make an irradiated pattern by electron ray on the surface of the sealing member 121 (FIG. 8A), metal sheet 122 having a plurality of slit patterns as is shown for example in FIG. 8B can be used. Slits 122a are there in the metal sheet 122 as shown in FIG. 8B.

Electron ray can not pass (penetrate) through metal, so a portion of the sealing member 121 covered by the metal sheet is not susceptible to the influence of radiation ray. This phenomena can be effectively used in Fifth Embodiment.

Figure 8C:
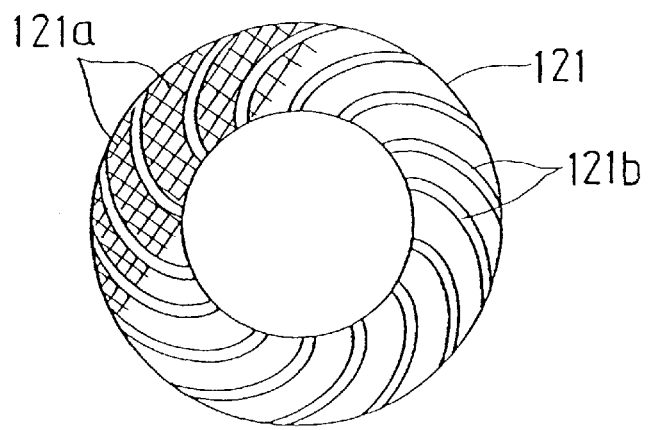
FIG. 8C is a schematic view showing a washer-like thermoplastic elastomer member after irradiation by radiation ray of the present invention.

First, placing metal sheet 122 having a pattern of a plurality of helical slits on the sealing member 121. Then electron ray is irradiated through slits of the metal sheet to make the pattern on the sealing member (FIG. 8C). In FIG. 8C, the cross-hutching regions 121a are highly electron irradiated portions or harder portions by electron ray. On the other hand the regions 121b are non-irradiated portions or softer portions.

FIG. 9 (Chart Table) shows physical (tensile strength at break or the like) properties of the test specimens. The specimen were prepared using Diel Thermoplastic T630 (manufactured by DAIKIN Co.) as a fluorothermoplastic elastomer and carbon black (HAF grade carbon black, 30 weight parts based on 100 weight parts of elastomer). The specimen were irradiated with various exposure dose. There is no changes in modulus of elasticity at 100% elongation except strength at break in the case of base polymer as shown in Chart Table 9.

In the case of the composition comprising base polymer and carbon black, there are somewhat large changes in elasticity of the composition by radiating electron ray, as shown in Chart Table 9. Modulus elasticity at 100% elongation increases with increasing radiation dose. Therefore various sealing members for various applications can be obtained by combination of the property of rubber composition with slit pattern of metal sheet 122.

The thus obtained sealing members 121 have grooves at non- or a little-irradiated portion and show pumping function (sealing function) when the thus obtained sealing members is mounted on the shaft 250. The thus obtained sealing member 121 can be used in a sealing device 25 in FIG. 7C.

Effect of the Present Invention

As explained in First and Second Embodiment, by using hardness changing means of changing hardness in rubber materials, hardness distribution on a surface of a sealing lip can be made helically. When there is a relative movement between the sealing lip and a shaft to be sealed, a softer portion other than a harder portion tends to deform and elongate larger, to form groove like concave helical portion due to friction between the shaft and the sealing lip; that is, the harder portion becomes convex like helical rib showing such same pumping function as conventional helical ribs show.

The harder portion of the sealing lip has also more resistance to abrasion against the shaft when compared to a conventional rib which has same hardness of sealing lip.

Moreover, there is no need to form a rib in a mold to be used for molding a conventional sealing device, manufacturing process and designing process of a mold become more easily.

It is easy to make various hardness distribution because hardness can be easily controlled by controlling irradiation energy(acceleration voltage) and dose.

As explained above in Third to Fifth embodiment of another type of sealing device, by changing mechanical properties in a specific region of a sealing member, for example, helical or concentric circular grooves can be formed, without using a mechanical process or a pressing process, thereby providing a sealing device and a process for manufacturing the same with high productivity.

There is no cutting portion in the sealing member of the present invention therefore a breaking or a fracture phenomenon at a conventional cutting portion can be effectively prevented, and sealing devices having a long life or durability can be obtained.

What is claimed is:

1. A sealing device disposed between a relatively movable shaft and a housing, said sealing device comprising:
   a rigid annular casing;
   a molded elastic rubber annular sealing lip provided on said rigid annular casing and disposed in an axial direction of said rigid annular casing, said annular sealing lip having a frustoconical air-side surface and a frustoconical oil-side surface on a radially inner surface of said sealing lip;
   a portion of said sealing lip integrally formed as a part of said sealing lip being a cross-linking reaction to a source of radiation to become a harder portion of the sealing lip as compared to a remaining portion of the sealing lip;
   a surface of said harder portion disposed on said frustoconical air-side surface;
   a hardness of said harder portion being harder than a hardness of the remaining portion of said sealing lip; and
   a plurality of said harder portions being arranged independently in a circumferential direction of said sealing lip so as to provide alternating hard and soft regions in a single unitary piece sealing lip.

2. The sealing device according to claim 1, wherein said harder portion has a helical shape.

3. The sealing device disposed between the relatively movable shaft and the housing according to claim 1, further comprising a third frustoconical surface disposed between said frustoconical oil-side surface and said frustoconical air-side surface.

4. The sealing disposed between the relatively movable shaft and the housing according to claim 3, wherein said third frustoconical surface has a plurality of harder helical portions, a hardness of said harder helical portions is harder than that of the sealing lip.

5. The sealing device disposed between the relatively movable shaft and the housing according to claim 4, wherein said harder portion is formed by irradiation of a radiation ray.

6. A sealing device disposed between a relatively movable shaft and a housing, said sealing device comprising;
   a rigid annular casing;
   a molded rubber annular sealing lip provided on said rigid annular casing and disposed in an axial direction of said rigid annular casing, said sealing lip having a radially inner portion for slidably and sealingly engaging with said shaft;
   a thermoplastic elastomer-based sealing member disposed between said rigid annular casing and said annular sealing lip, said thermoplastic sealing member having a sealing portion for contacting with said shaft to be sealed, said sealing portion being spaced apart from said radially inner portion of said sealing lip; and a portion of said sealing portion of said thermoplastic elastomer-based sealing member being integrally formed as a part of said sealing member and being a cross-linking reaction to a source of radiation to become a harder portion of the sealing member as compared to a remaining portion of said thermoplastic elastomer-based sealing member, said sealing member thereby providing alternating hard and soft regions in a single unitary piece sealing member so that said harder portion acts as a pumping rib when there is a relative movement between said sealing device and said shaft.

7. The sealing device according to claim 6, wherein said thermoplastic elastomer-based sealing member is made from a plain annular member, an inner periphery of which is turned in an axial direction of said sealing device toward said rubber sealing lip, to form a sealing surface slidably and sealingly engaging with said shaft to slide and seal.

8. The sealing device according to claim 6, wherein said thermoplastic elastomer-based sealing member is made of a composition comprising a fluoro thermoplastic elastomer.

* * * * *